Figure 1:
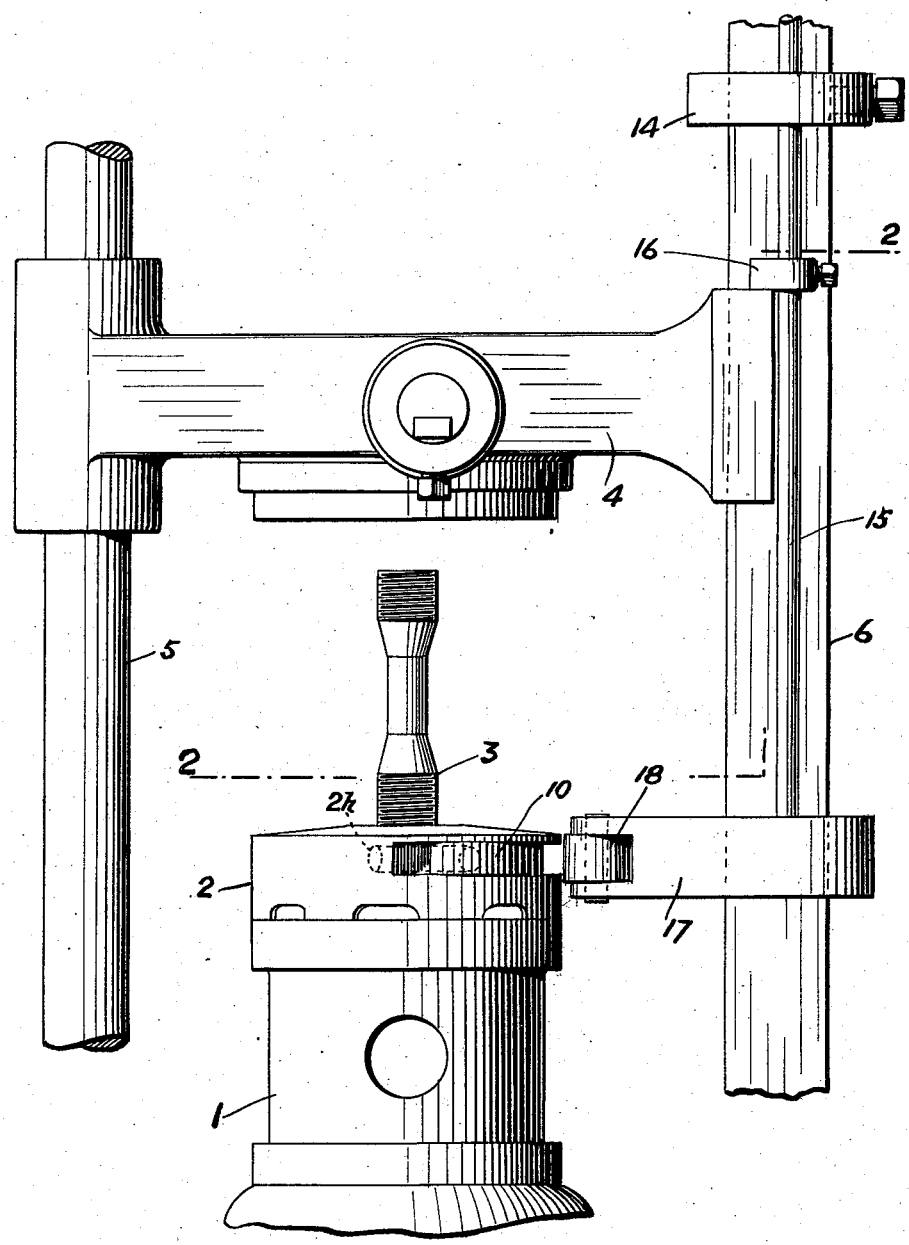

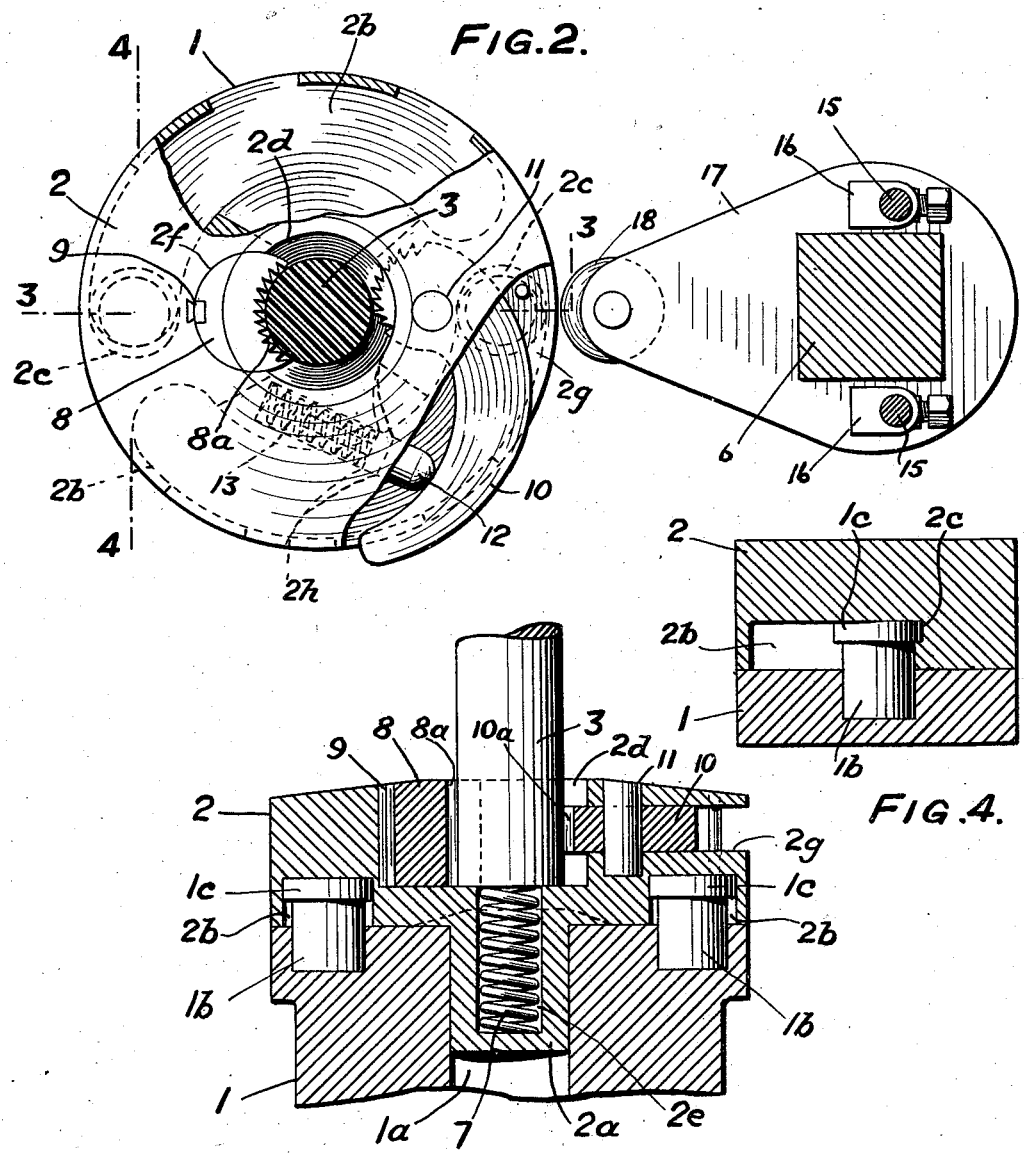

UNITED STATES PATENT OFFICE.

ALBERT W. MARTIN, OF INDIANAPOLIS, INDIANA, ASSIGNOR TO EDWIN HARRINGTON, SON & CO., INC., OF PHILADELPHIA, PENNSYLVANIA, A CORPORATION OF PENNSYLVANIA.

CHUCK.

1,010,162.  Specification of Letters Patent.  Patented Nov. 28, 1911.

Application filed December 23, 1910. Serial No. 598,932.

*To all whom it may concern:*

Be it known that I, ALBERT W. MARTIN, a citizen of the United States, residing in the city of Indianapolis, in the county of Marion and State of Indiana, have invented certain Improvements in Chucks, of which the following is a specification.

My invention is a mechanism designed for automatically engaging and holding an end of the stock to be operated upon and for automatically disengaging and ejecting the stock at the end of the operation thereon.

The leading object of my invention is to provide a simple mechanism, conveniently operated while in motion, which will perform the foregoing functions.

In the accompanying drawings, Figure 1 is an elevation of mechanism embodying my improvements; Fig. 2 is a broken sectional view taken on the line 2—2 of Fig. 1; Fig. 3 is a vertical sectional view taken on the line 3—3 of Fig. 2; and Fig. 4 is a sectional view taken on the line 4—4 of Fig. 2.

The mechanism, as illustrated in the drawings, comprises a revoluble spindle 1 having fixed thereto a chuck body 2 which carries a bolt 3, in combination with a cutting head 4, adapted for reciprocating along the guides 5 and 6, the bolt being revolved in the head as the latter is reciprocated.

The spindle 1 is provided with the central aperture $1^a$ and the studs $1^b$, the latter having heads $1^c$ thereon; and the chuck is provided with the arbor $2^a$ which fits the aperture $1^a$, the circular channels $2^b$ which receive the studs $1^b$ and the recesses $2^c$ which receive the heads $1^c$; this arrangement providing for the ready engagement and disengagement of the chuck with relation to the spindle by turning one relatively to the other.

The chuck body is provided with a central recess $2^d$ for receiving the end of the bolt 3 which is seated on the bottom of the recess and caused to compress the coiled spring 7 which lies in the chamber $2^e$ within the arbor $2^a$. A crescent like clutching member 8 is set in a cylindrical socket $2^f$, which is formed in the chuck body parallel to and intersecting the recess $2^d$, the clutching member being held in the socket by a key 9 and having the circularly disposed serrations $8^a$ for engaging the periphery of the end of the bolt 3. A recess $2^g$, extending from the periphery to the central recess of the chuck body, receives the curved clutch lever 10 which is fulcrumed on the stud 11 set in the body eccentrically to its center, the lever having the circularly disposed serrations $10^a$ on its head for engaging the periphery of the end of the bolt 3. The tail of the lever 10 is pressed outwardly and the head is pressed inwardly, to engage the bolt, by a plunger 12 guided by a socket $2^h$ which is formed in the body and contains the coiled spring 13 for pressing the plunger outwardly, whereby the tail of the lever extends beyond the head normally.

The guide 6 has fixed thereto a collar 14 which guides the rods 15 movable therethrough. Trip blocks 16 are fixed on the respective rods 15 in the path of the cutting head 4, and a block 17, carrying a roller 18, is fixed to the rods.

When the head 4, in its movement from the bolt, makes contact with the trip blocks 16, the movement is communicated through the rods 15 to the block 17, the roller 18 is carried into the plane of the lever 10, and, as the latter is revolved by the spindle, its tail makes contact with and is pressed in by the roller, disengaging the bolt 3 which is ejected by the spring 7.

It will be understood that the stock can be inserted while the roller presses the tail of the lever 10 inwardly and after the finished bolt has been ejected.

Having described my invention, I claim:

1. A chuck comprising a body having a fixed clutching member, in combination with a movable clutching member carried by said body and coacting with said member first named for engaging work, means carried by said body and comprising a spring for moving said second named member toward said first named member to effect the engagement of work, and means independent of said chuck for moving said second named member away from said first named member and disengaging said work.

2. A revoluble chuck having a body containing an aperture adapted for receiving work, a clutching lever fulcrumed on said body, said lever being movable into and out of engagement with work seated in said body, means comprising a spring carried by said body for automatically throwing said lever into engagement with said work, and means independent of said chuck for engaging said lever and moving it out of engagement with said work.

3. A chuck, in combination with a spindle, one of said members having circular channels therein and the other of said members having studs thereon adapted to be engaged in said channels.

4. A chuck having an arbor and circular channels, in combination with a spindle having a recess adapted for receiving said arbor, and studs for engaging said channels, whereby said spindle revolves said chuck.

5. A chuck having clutching means, mechanism for revolving said chuck, a movable cutting head adapted for operating upon a stock held by said chuck, and means operated by said cutting head whereby said clutching means are actuated.

6. A revoluble chuck having a movable clutching member, means for automatically moving said member into its engaging position, a guide, a cutting head adapted to reciprocate along said guide, a guiding device carried by said guide, a rod adapted to reciprocate under control of said device, and means carried by said rod whereby said member is moved from its engaging position.

7. A revoluble chuck having a clutching member fulcrumed thereon, a pair of guides, a cutting head reciprocating under control of said guides, one or more rods, means fixed to one of said guides whereby said rod or rods are guided, one or more blocks fixed to said rod or rods and adapted to be engaged by said head, and means carried by said rod or rods and movable by said head into position for moving said lever.

In witness whereof I have hereunto set my name this 8th day of December, 1910, in the presence of the subscribing witnesses.

ALBERT W. MARTIN.

Witnesses:
CHARLES ALCON,
CAROLILE ALCON.

Copies of this patent may be obtained for five cents each, by addressing the "Commissioner of Patents, Washington, D. C."